United States Patent Office 3,491,090
Patented Jan. 20, 1970

3,491,090
CYCLOBUTANO- AND CYCLOBUTENO - (3',4':6,7) DERIVATIVES OF THE CORTICOID SERIES
John H. Fried, Palo Alto, Calif., assignor to Syntex Corporation, Panama, Republic of Panama, a corporation of Panama
No Drawing. Continuation-in-part of application Ser. No. 544,680, Apr. 25, 1966. This application Apr. 10, 1967, Ser. No. 629,369
Int. Cl. C07c 173/00, 169/28, 167/06
U.S. Cl. 260—239.55                    18 Claims

ABSTRACT OF THE DISCLOSURE

Cyclobutano-(3',4':6,7) derivatives of the corticoid series useful as anti-inflammatory agents are prepared by the photochemical cycloaddition of maleic anhydride, dimethylmaleic anhydride or difluoromaleic anhydride to a 3-keto-Δ⁴,⁶-diene of the corticoid series. Subsequently, these anhyride derivatives are hydrolyzed under basic conditions to the free acid adducts which can be esterified or oxidatively decarboxylated to a corresponding cyclobuteno-(3',4':6,7) derivative.

This is a continuation-in-part of application, Ser. No. 544,680, filed Apr. 25, 1966, now abondoned.

The present invention relates to novel cyclobutano- and cyclobuteno-(3',4':6,7) corticoids and to methods for the preparation thereof.

More specifically, the present invention relates to novel corticoids represented by the following formulas:

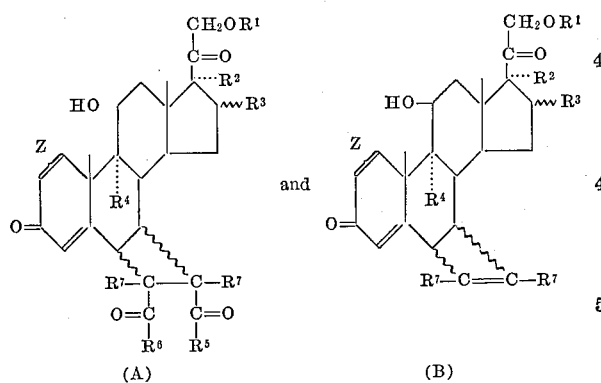

(A)                                    (B)

wherein
$R^1$ is hydrogen, tetrahydroyran-2'-yl or a hydrocarbon carboxylic acyl group containing less than 12 carbon atoms;
$R^2$ is hydrogen, hydroxy or a hydrocarbon carboxylic acyloxy group of less than 12 carbon atoms;
$R^3$ is hydrogen, α-methyl, β-methyl, α-fluoro, α-hydroxy, α-hydrocarbon carboxylic acyloxy group of less than 12 carbon atoms;

$R^2$ and $R^3$ together is the group

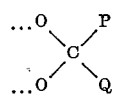

in which P is hydrogen or lower alkyl and Q is hydrogen, lower alkyl or aryl;
$R^4$ is hydrogen or fluoro;
$R^5$ and $R^6$ are each hydroxy or lower alkoxy or together is oxy;
$R^7$ is hydrogen, methyl or fluoro; and
Z is a carbon-carbon single bond or a carbon-carbon double bond.

The wavy line "⌇" at C-6 and C-7 indicates both alpha and beta configurations for the novel cyclobutano-(3',4':6,7) and cyclobuteno-(3',4':6,7) derivatives of the present invention, i.e. the cyclobutano-(3',4':6α,7α), the cyclobutano-(3',4',:6β7β) the 1'-cyclobuteno-(3',4':6α 7α) and 1'-cyclobuteno-(3',4':6β,7β) derivatives of the corticoid series.

The hydrocarbon carboxylic acyl and acyloxy groups of the present invention contain less than 12 carbon atoms and are of a straight, branched, cyclic or cyclic-aliphatic chain structure. This structure is saturated, unsaturated, or aromatic and optionally substituted by functional groups such as hydroxy, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, adamantoate, dichloroacetate, and the like.

The term "lower alkyl," as used herein, refers to a straight or branched chain hydrocarbon group of less than 8 carbon atoms, such as methyl, ethyl, isopropyl and the like. The term "aryl" refers to a hydrocarbon group containing one aromatic ring such as phenyl, benzyl, o-, m- or p-tolyl and the like, of up to 8 carbon atoms. The term "lower alkoxy" refers to the group —OR wherein R is a straight or branched chain alkyl group of less than 8 carbon atoms. Typical lower alkoxy groups thus include methoxy, ethoxy, butoxy, isopropoxy, amyloxy or the like. The term "dicarbonyloxy," as used herein, refers to the anhydride grouping

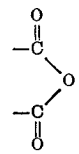

this grouping being attached to C-1' and C-2' of the cyclobutano moiety.

The expressions "corticoid series" and "corticoids," as used herein, refer to steroids of the pregnane series containing a free or protected hydroxy group at position C-21.

The novel compounds of the present invention are valuable corticoids with high anti-inflammatory and low catabolic activities and are useful in the treatment of rheumatoid arthritis, contact dermatitis, allergies and the like. These compounds can be administered via usual routes, e.g. topically, in pharmaceutically acceptable compositions and at dosage rates of from 0.5γ to 5 mg./kg./day. However, dosage rates below or above this range can also be used, the most favorable dosage range being conditioned upon the purpose for which it is administered and the response thereto The novel 3-keto-Δ⁴-ene corticoids of the present invention are prepared in accordance with the following reaction sequence:

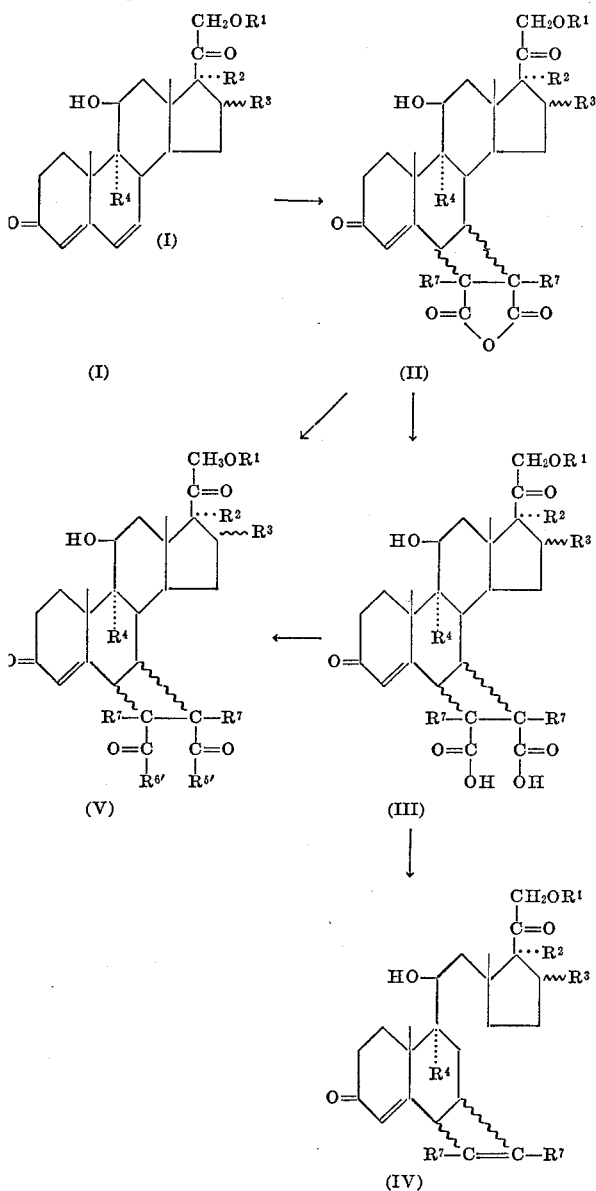

wherein R⁵′ and R⁶′ are each lower alkoxy; and all other substituents are as defined hereinabove.

The novel 3-keto-Δ¹,⁴-diene corticoids of the present invention are prepared from the corresponding novel 3-keto-Δ⁴-ene compounds of Formulas (II→V) by treatment with 2,3-dichloro-5,6-dicyanobenzoquinone.

In the practice of the present invention, the starting material of Formula I, i.e. an unsubstituted or appropriately substituted 3-keto-Δ⁴,⁶-diene, and an anhydride of the Formula VI:

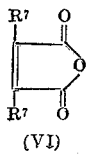

(VI)

wherein R⁷ is as previously defined, are irradiated with ultra-violet light in an inert organic solvent such as benzene, dioxane and the like, or mixtures thereof, to effect the photochemical cycloaddition of the anhydride and thereby afford a cyclobutano-(3′,4′:6,7) cycloaddition product as shown by Formula II. A preferred choice for the cycloaddition reaction employs a mixture of benzene: dioxane as the inert solvent mixture and ultraviolet light of a wavelength of about 270 to about 330 mμ. The photochemical reaction is preferably performed at room temperature for from about 15 minutes to about 12 hours, three hours being generally sufficient.

Any suitable source of ultraviolet irradiation of a wavelength of about 270 to about 330 mμ can be employed for the photochemical cycloaddition reaction. Among such sources are commercially available high pressure mercury vapor lamps such as a 70 watt Hanau lamp, a 200 watt Hanovia lamp, and the like.

Under the above conditions, the photochemical cycloaddition of the anhydride occurs at the 4,5- and 6,7-double bonds to afford a mixture of 4,5-cyclobutano and 6,7-cyclobutano adducts, and the 6,7-cyclobutano adducts are generally the major products. The orientation of the resulting 4,5-cyclobutano adduct with respect to the steroid nucleus is predominantly alpha. The orientation of the resulting 6,7-cyclobutano adducts with respect to the steroid nucleus is both alpha and beta, i.e. the adducts having the 6α,7α- and 6β,7β-configurations. The mixture of products can be separated at this point by conventional techniques such as by fractional crystallization from benzene:ether, and the like. Alternatively, the mixture of the 4α,5α-, 6α,7α- and 6β,7β-cyclobutano adducts is used in the next step and then the isomers are separated at a later stage as indicated below.

Subsequent to the photochemical cycloaddition the mixture of cycloaddition products, i.e. the 4,5-adduct and the 6,7-adducts, are hydrolyzed under basic conditions and subsequently acidified to yield a mixture of the corresponding cyclobutano adducts, containing free carboxylic acid groups at the C-1′ and C-2′ positions of the cyclobutano moiety (Formula III). Basic conditions such as an alkali metal bicarbonate or carbonate in an aqueous solution of a low molecular weight alcohol, dioxane, tetrahydrofuran and the like, at room temperature or up to the reflux temperature of the aqueous solution for a period of ½ to 3 hours can be employed to carry out the hydrolysis. Preferably, basic hydrolysis with sodium bicarbonate in aqueous dioxane at room temperature for about one hour is employed and followed by acidification with an inorganic or an organic acid, preferably an aqueous solution of an inorganic acid such as hydrochloric acid.

This mixture containing the 4α,5α-, 6α,7α- and 6β,7β-cyclobutano adducts containing free carboxylic acid groups at the C-1′ and C-2′ positions of the cyclobutano moiety is preferably separated at this point by conventional techniques such as column chromatography, preferably on a silica gel column eluting with ethyl acetate:hexane containing a trace, e.g. about 0.5% by volume, of 98% formic acid to afford the novel cyclobutano-(3′,4′:6α,7α) and cyclobutano-(3′,4′:6β,7β) compounds of Formula III.

Alternatively, the 6α,7α-cyclobutano adduct or the 6β,7β-cyclobutano adduct of Formula II can each be separately carried through the hydrolysis procedure to afford the corresponding 6α,7α- or 6β,7β-isomers containing free carboxylic acid groups at the C-1′ and C-2′ positions of the cyclobutano moiety of Formula III.

The 1′,2′ - dicarboxycyclobutano - (3′,4′:6α,7α) compound and the corresponding 6β,7β-isomer of Formula III are each separately converted by an oxidative decarboxylation reaction with an oxidizing agent such as with lead tetraacetate, thallium triacetate, and the like, in an inert organic solvent such as dioxane, benzene, tetrahydrofuran, diethyleneglycol dimethylether, xylene, or the like, or by an electrochemical oxidation reaction at the anode of an electrolytic cell to form a corresponding 1'-cyclobuteno-(3',4':6,7) compound of Formula IV. In the practice of this conversion (III→IV) any free hydroxyl groups at the 11β, 16α, 17α, and/or 21-positions are converted to a 11β, 16α, 17α, and/or 21-acyloxy derivative by a conventional technique prior to the oxidative decarboxylation reaction and regenerated subsequently. For example, the free hydroxy groups are esterified by treatment with acetic anhydride and p-toluenesulfonic acid in glacial acetic acid at room temperature for about 24 hours. Subsequent to the oxidative decarboxylation reaction, the free hydroxy groups are reformed by conventional hydrolysis of the acyloxy groups such as with potassium hydroxide in methanol.

The novel 1',2'-dicarboalkoxycyclobutano-(3',4':6,7) derivatives of Formula V are obtained from the 1',2'-dicarbonyloxycyclobutano-(3',4':6,7) derivatives of Formula II or the 1',2'-dicarboxycyclobutano-(3',4':6,7) derivatives of Formula III by an esterification procedure such as by refluxing a compound of Formula II or III in an excess of an alcohol containing less than 8 carbon atoms and in the presence of a strong acid such as sulfuric acid, p-toluenesulfonic acid, benzenesulfonic acid, and the like. The preferred choice of acid is p-toluenesulfonic acid.

In the practice of these conversions, i.e. (II→V) and (III→V), either a mixture of the 4,5- and 6,7-cyclobutano adducts or the individual 6α,7α- and 6β,7β-cyclobutano adducts thereof can be employed for the preparation of the diesters of Formula V. For those cases wherein a mixture is used, the final diester products are separated by a conventional technique such as column chromatography as described hereinabove. In the practice of these conversions, any acyloxy groups at the 16α, 17α or 21-positions are hydrolyzed in the course of the above esterification procedure to the free hydroxy group. The free hydroxy group can be esterified subsequently, if desired, e.g. by treatment with a hydrocarbon carboxylic acid anhydride in pyridine or in the presence of p-toluenesulfonic acid in glacial acetic acid, and the like. In addition, a 21-(tetrahydropyran-2'-yloxy) group in a compound of Formulas II and III is hydrolyzed in the course of the conversion to a compound of Formula V and can be reformed subsequently, if desired, by treatment with, e.g. dihydropyran in the presence of p-toluenesulfonic acid in benzene, and the like.

In the practice of the above outlined reaction sequence, the starting material of Formula I can contain free hydroxy groups at C-16, C-17 and/or C-21 which upon completion of the photochemical cycloaddition reaction can be further elaborated by conventional techniques. Thus, for example, a 21-hydroxy group in a compound of Formulas II through V is treated with dihydropyran and an acid catalyst such as p-toluenesulfonic acid either alone or in a cosolvent such as benzene or with a hydrocarbon carboxylic acid anhydride in pyridine in an inert solvent such as benzene to yield a corresponding 21-tetrahydropyran-2'-yloxy or 21-acyl substituent. Alternatively, a 16α and/or 17α-hydroxy group is treated with a hydrocarbon carboxylic acid anhydride in the presence of an acid catalyst such as p-toluenesulfonic acid in an inert organic solvent such as benzene at room temperature for a period of 1 to 24 hours to yield a corresponding 16α- and/or 17α-acyloxy substituent. In addition, a 16α,17α-diol compound of Formulas II through V can be treated with an aldehyde or ketone such as e.g. acetone and an acid catalyst such as 70% perchloric acid at room temperature for a period of about one to ten hours to form a corresponding 16α,17α-acetal or ketal, such as for example, a 16α,17α-isopropylidenedioxy derivative of Formulas II through V.

The 1'-cyclobuteno-(3',4':6α,7α) compounds of Formula IV and the 6β,7β-isomers thereof, in addition to having valuable pharmacological activity are useful as intermediates for the preparation of a corresponding cyclobutano-(3',4':6,7) compound of Formula VII:

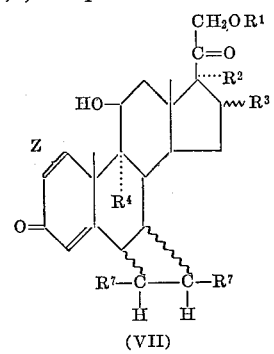

wherein all substituents are as defined hereinabove.

To obtain the compounds of Formula VII, a 1'-cyclobuteno compound of Formula IV is catalytically hydrogenated, for example, with a Wilkinson catalyst, i.e. tristriphenylphosphine rhodium chloride in a mixture of ethyl acetate: ethanol as the solvent, for a time sufficient to consume the theoretical amount of hydrogen.

The $\Delta^{4,6}$-starting materials of Formula I are conveniently prepared by treating the corresponding 3-keto-$\Delta^{-4}$-ene compound with chloranil in a solvent such as t-butanol, xylene or the like, under reflux for a period of 1 to 12 hours.

The following examples are set forth to illustrate but are not intended to limit the scope of the present invention.

EXAMPLE 1

A mixture of 2 g. of 11β,17α,21-trihydroxypregna-4,6-diene-3,20-dione and 0.8 g. of maleic anhydride in 70 ml. of benzene and 70 ml. of dioxane in a Pyrex container is irradiated with a 200 watt high pressure mercury vapor lamp at room temperature for a period of three hours. At the end of the reaction time, which is followed by the U.V. spectra, the reaction mixture is evaporated to dryness to furnish a residue containing a 4α,5α-maleic anhydride adduct, a 6α,7α-maleic anhydride adduct and a 6β,7β-maleic anhydride adduct. One gram of the residue is separated by fractional crystallization employing benzene-ether to yield 1',2'-dicarbonyloxycyclobutano-(3',4':4α,5α)-11β,17α,21-trihydroxypregn-4-ene-3,20-dione;
1',2'-dicarbonyloxycyclobutano-(3',4':6α,7α)-11β,17α,21-trihydroxypregn-4-ene-3,20-dione; and
1',2'-dicarbonyloxycyclobutano-(3',4':6β,7β)-11β,17α,21-trihydroxypregn-4-ene-3,20-dione.

One gram of the residue containing the mixture of adducts is allowed to stand at room temperature for three hours with 1 g. of sodium bicarbonate in 10 ml. of water and 90 ml. of dioxane. At the end of the reaction time, the mixture is acidified with aqueous hydrochloric acid, and the solvents are evaporated under reduced pressure. The resulting residue is partitioned between ethyl acetate and water and the ethyl acetate phase is separated, dried, and evaporated to dryness under reduced pressure to yield the crude mixture of diacids. The crude mixture is then chromatographed on a silica gel column eluting with ethyl acetate:hexane containing 0.5% by volume of 98% formic acid to yield 1',2'-dicarboxycyclobutano-(3',4':4α,5α)-11β,17α,21-trihydroxypregn-4-ene-3,20-dione;
1',2'-dicarboxycyclobutano-(3',4':6α,7α)-11β,17α,21-trihydroxypregn-4-ene-3,20-dione; and
1',2'-dicarboxycyclobutano-(3',4':6β,7β)-11β,17α,21-trihydroxypregn-4-en-3,20-dione, each of which is recrystallized separately from methanol: ether.

Utilizing the above procedure, the following starting materials, namely

9α-fluoro-11β,17α-dihydroxy-21-acetoxypregna-4,6-diene-3,20-dione;
11β,16α,17α,21-tetrahydroxypregna-4,6-diene-3,20-dione;
11β,17α,21-trihydroxy-16α-methylpregna-4,6-diene-3,20-dione;
9α-fluoro-11β,16α,17α,21-tetrahydroxypregna-4,6-diene-3,20-dione;
9α-fluoro-11β,17α,21-trihydroxy-16α-methylpregna-4,6-diene-3,20-dione;
11β,17α,21-trihydroxy-16α-fluoropregna-4,6-diene-3,20-dione;
11β,17α,21-trihydroxy-16β-methylpregna-4,6-diene-3,20-dione;
11β,21-dihydroxy-16α-methylpregna-4,6-diene-3,20-dione; and
9α-fluoro-11β,21-dihydroxy-16α-methylpregna-4,6-diene-3,20-dione;

are converted to the 1′,2′-dicarboxycyclobutano-(3′4′:-6α,7α) and 1′,2′-dicarboxycyclobutano-(3′,4′:6β,7β) compounds, namely 1′,2′-dicarboxycyclobutano-(3′,4′:6α,7α)-9α - fluoro-11β,17α-dihydroxy-21-acetoxypregn-4-ene-3,20 - dione, and the 6β,7β-isomer;
1′,2′-dicarboxycyclobutano-(3′,4′:6α,7α)-11β,16α,17α,21-tetrahydroxypregn-4-ene-3,20 - dione, and the 6β,7β-isomer;
1′,2′ - dicarboxycyclobutano-(3′,4′:6α,7α) - 11β,17α,21-trihydroxy - 16α - methylpregn-4-ene-3,20-dione, and the 6β,7β-isomer;
1′,2′ - dicarboxycyclobutano - (3′,4′:6α,7α)-9α - fluoro-11β,16α,17α,21 - tetrahydroxypregn-4-ene-3,20 - dione, and the 6β,7β-isomer;
1′,2′ - dicarboxycyclobutano - (3′,4′:6α,7α)-9α - fluoro-11β,17α,21-trihydroxy-16α-methylpregn - 4 - ene-3,20-dione, and the 6β,7β-isomer;
1′,2′- - dicarboxycyclobutano - (3′,4′:6α,7α)-11β,17α,21-trihydroxy - 16α - fluoropregn-4-ene-3,20-dione, and the 6β,7β-isomer;
1′,2′ - dicarboxycyclobutano - (3′,4′:6α,7α) - 11β,17α,21-trihydroxy - 16β - methylpregn-4-ene-3,20-dione, and the 6β,7β-isomer;
1′,2′ - dicarboxycyclobutano - (3′,4′:6α,7α)-11β,21-dihydroxy-16α-methylpregn-4-ene-3,20-dione, and the 6β,-7β-isomer; and
1′,2′ - dicarboxycyclobutano - (3′,4′:6α,7α) - 9α-fluoro-11β,21-dihydroxy - 16α - methylpregn-4-ene-3,20-dione, and the 6β,7β-isomer, respectively.

EXAMPLE 2

Utilizing the procedure of Example 1 with the exception of substituting the following anhydrides, namely dimethylmaleic anhydride and then difluoromaleic anhydride in place of maleic anhydride, the starting materials of Example 1 are converted to the corresponding 1′,2′-dimethyl - 1′,2′ - dicarboxycyclobutano-(3′,4′:6α,7α) compounds and the 6β,7β-isomers thereof and the corresponding 1′,2′-difluoro-1′,2′-dicarboxycyclobutano-(3′,4′:6α,7α) compounds and the 6β,7β-isomers thereof, respectively. Among those obtained are the following specific compounds:

1′,2′ - dimethyl-1′,2′-dicarboxycyclobutano-(3′,4′:6α,7α)-11β,17α,21-trihydroxypregn-4-ene-3,20-dione, and the 6β,7β-isomer;
1′,2′ - difluoro - 1′,2′-dicarboxycyclobutano-(3′,4′:6α,7α)-11β,17α,21-trihydroxypregn-4-ene-3,20-dione, and the 6β,7β-isomer; and
1′,2′ - dimethyl-1′,2′-dicarboxycyclobutano-(3′,4′:6α,7α)-9α-fluoro - 11β,21 - dihydroxy-16α-methylpregn-4-ene-3,20-dione, and the 6β,7β-isomer.

EXAMPLE 3

A mixture of 1 g. of 1′,2′-dicarboxycyclobutano-3′,4′:-6α,7α) - 11β,17α,21 - trihydroxypregn-4-ene-3,20-dione, 1 g. of p-toluenesulfonic acid monohydrate, 50 ml. of acetic acid and 25 ml. of acetic anhydride is allowed to stand at room temperature for 24 hours, and then is poured into water and stirred. This mixture is then extracted with methylene chloride, and the methylene chloride extracts are dried and evaporated to dryness to yield 1′,2′-dicarboxycyclobutano-(3′,4′:6α,7α) - 11β,17α,21-triacetoxypregn-4-ene-3,20-dione which is recrystallized from acetone:ether.

A mixture of 1 g. of the latter material and 5 g. of lead tetraacetate in 20 ml. of dioxane is heated at 90° C. under nitrogen for 45 minutes. The dioxane is removed under reduced pressure, and the residue is partitioned between ethyl acetate and 2 N hydrochloric acid. The organic phase is separated, then washed with water, dried and evaporated to dryness to yield 1′-cyclobuteno-(3′,4′:6α,7α) - 11β,17α,21 - triacetoxypregn-4-ene-3,20-dione.

A solution of 0.17 g. of potassium hydroxide in 0.2 ml. of water and 2.5 ml. of methanol is added over 30 minutes to a refluxing solution of 1 g. of 1′-cyclobuteno-(3′,4′:6α,7α)-11β,17α,21-triacetoxypregn-4-ene-3,20-dione in 30 ml. of methanol under nitrogen. The solution is refluxed for two hours, cooled, neutralized with acetic acid and concentrated under reduced pressure. After the addition of water, the solid which forms is collected by filtration and dried to yield 1′-cyclobuteno-(3′,4′:6α,7α)-11β,17α,21-trihydroxypregn-4-ene-3,20-dione which is recrystallized from acetone:hexane.

By repeating the above procedure with the 6β,7β-isomer, there is obtained the corresponding 1′-cyclobuteno-(3′,4′:6β,7β)-11β,17α,21-trihydroxypregn - 4 - ene - 3,20-dione.

Utilizing the above procedure, the 1′,2′-dicarboxycyclobutano-(3′,4′:6α,7α) compounds of Examples 1 and 2 and the corresponding 1′,2′-dicarboxycyclobutano-(3′,4′:6β,7β) compounds of the same examples are converted to the corresponding 1′-cyclobuteno-(3′,4′:6α,7α) and 1′-cyclobuteno-(3′,4′:6β,7β) final products. Among them are the following specific compounds:

1′-cyclobuteno-(3′,4′:6α,7α)-9α-fluoro-11β,17α,21-trihydroxypregn-4-ene-3,20-dione, and the 6β,7β-isomer;
1′-cyclobuteno-(3′,4′:6α,7α)-11β,16α,17α,21-tetrahydroxypregn-4-ene-3,20-dione, and the 6β,7β-isomer;
1′-cyclobuteno-(3′,4′:6α,7α)-11β,17α,21-trihydroxy-16α-methylpregn-4-ene-3,20-dione, and the 6β,7β-isomer;
1′-cyclobuteno-(3′,4′:6α,7α)-9α-fluoro-11β,16α,17α,21-tetrahydroxypregn-4-ene-3,20-dione, and the 6β,7β-isomer;
1′-cyclobuteno-(3′,4′:6α,7α)-9α-fluoro-11β,17α,21-trihydroxy-16α-methylpregn-4-ene-3,20-dione, and the 6β,7β-isomer;
1′-cyclobuteno-(3′,4′:6α,7α)-11β,17α,21-trihydroxy-16α-fluoropregn-4-ene-3,20-dione, and the 6β,7β-isomer;
1′-cyclobuteno-(3′,4′:6α,7α)-11β,17α,21-trihydroxy-16β-methylpregn-4-ene-3,20-dione, and the 6β,7β-isomer;
1′-cyclobuteno-(3′,4′:6α,7α)-11β,21-dihydroxy-16α-methylpregn-4-ene-3,20-dione, and the 6β,7β-isomer; and
1′-cyclobuteno-(3′,4′:6α,7α)-9α-fluoro-11β,21-dihydroxy-16α-methylpregn-4-ene-,3,20-dione, and the 6β,7β-isomer.

EXAMPLE 4

To a mixture of 100 ml. of ethyl acetate and 100 ml. of ethanol is added 2 g. of tris-triphenylphosphine rhodium chloride catalyst. The mixture, at room temperature, is flushed with nitrogen followed by flushing with hydrogen. A solution of 2 g. of 1'-cyclobuteno-(3',4':6β,7β)-11β,17α,21-trihydroxypregn-4-ene-3,20-dione in 50 ml. of ethyl acetate:ethanol (1:1) is then added. This mixture is then agitated in a hydrogen atmosphere at room temperature for about 30 minutes. The catalyst is removed by filtration through silica gel and the filtrate is evaporated to dryness to yield cyclobutano-(3',4':6β,7β)-11β,17α,21-trihydroxypregn-4-ene-3,20-dione which is purified by recrystallization from acetone:hexane.

By using a similar procedure, the corresponding 6α,7α-isomer is converted to the corresponding cyclobutano-(3',4':6α,7α)-11β,17α,21-trihydroxypregn - 4 - ene - 3,20-dione.

Utilizing a similar procedure, the 1'-cyclobuteno-(3',4':6α,7α) compounds of Example 3 and then the 1'-cyclobuteno-(3',4':6β,7β) compounds of Example 3 are each separately converted to the corresponding cyclobutano-(3',4':6α,7α) and cyclobutano-(3',4':6β,7β) compounds, respectively.

EXAMPLE 5

A mixture of 0.5 g. of 1'-cyclobuteno-(3',4':6α,7α)-11β,17α,21-trihydroxypregn-4-ene-3,20-dione, 10 ml. of dioxane and 0.35 g. of 2,3-dichloro-5,6-dicyano-1,4-benzoquinone is refluxed for ten hours. The mixture is then cooled, filtered and the filtrate is evaporated to dryness. The residue is dissolved in acetone, filtered through silica and the filtrate concentrated to dryness to yield 1'-cyclobuteno - (3',4':6α,7α) - 11β,17α,21 - trihydroxypregna-1,4-diene-3,20-dione.

Utilizing the above procedure, the 1'-cyclobuteno-(3',4':6α,7α) and 1' - cyclobuteno - (3',4':6β,7β) compounds of Example 3 and then the cyclobutano-(3',4':6α,7α) and cyclobutano-(3',4':6β,7β) compounds of Example 4 are converted to a corresponding Δ$^{1,4}$-diene analog. Among these are the following specific cyclobuteno compounds:

1'-cyclobuteno-(3',4':6α,7α)-9α-fluoro-11β,17α,21-trihydroxypregna-1,4-diene-3,20-dione,
  and the 6β,7β-isomer;
1'-cyclobuteno-(3',4':6α,7α)-11β,16α,17α-21-tetrahydroxypregna-1,4-diene-3,20-dione,
  and the 6β,7β-isomer;
1'-cyclobuteno-(3',4':6α,7α)-11β,17α,21-trihydroxy-16α-methylpregna-1,4-diene-3,20-dione,
  and the 6β,7β-isomer;
1'-cyclobuteno-(3',4':6α,7α)-9α-fluoro-11β,16α,17α,21-tetrahydroxypregna-1,4-diene-3,20-dione,
  and the 6β,7β-isomer;
1'-cyclobuteno-(3',4':6α,7α)-9α-fluoro-11β,17α,21-trihydroxy-16α-methylpregna-1,4-diene-3,20-dione,
  and the 6β,7β-isomer;
1'-cyclobuteno-(3',4':6α,7α)-11β,17α-21-trihydroxy-16α-fluoropregna-1,4-diene-3,20-dione,
  and the 6β,7β-isomer;
1'-cyclobuteno-(3',4':6α,7α)-11β,17α,21-trihydroxy-16β-methylpregna-1,4-diene-3,20-dione,
  and the 6β,7β-isomer;
1'-cyclobuteno-(3',4':6α,7α)-11β,21-dihydroxy-16α-methylpregna-1,4-diene-3,20-dione,
  and the 6β,7β-isomer; and
1'-cyclobuteno-(3',4':6α,7α)-9α-fluoro-11β,21-dihydroxy-16α-methylpregna-1,4-diene-3,20-dione, and the 6β,7β-isomer.

EXAMPLE 6

Utilizing the procedure of Example 5, 1',2'-dicarboxycyclobutano - (3',4':6α,7α) - 11β,17α - dihydroxy - 21-acetoxypregn-4-ene-3,20-dione is converted to 1',2'-dicarboxycyclobutano-(3',4':6α,7α) - 11β,17α - dihydroxy-21-acetoxypregna-1,4-diene-3,20-dione.

By repeating the above procedure with the 6β,7β-isomer, there is obtained the corresponding 1',2'-dicarboxycyclobutano - (3',4':6β,7β) - 11β,17α - dihydroxy - 21-acetoxypregna-1,4-diene-3,20-dione.

Utilizing the above procedure, the final products of Examples 1 and 2 afforded the 1', 2'-dicarboxycyclobutano-(3',4':6α,7α)-pregna-1,4-dienes and the 6β,7β-isomers thereof; the 1',2'-dimethyl-1',2'-dicarboxycyclobutano - (3',4':6α,7α) - pregna - 1,4 - diene, and the 6β,7β-isomers thereof; and the 1', 2'-difluoro-1',2'-dicarboxycyclobutano - (3',4':6α,7α) - pregna - 1,4-dienes and the 6β,7β-isomers thereof, of the present invention, examplary of which are the following specific compounds.

1',2'-dicarboxycyclobutano-(3',4':6α,7α)-11β,17α-dihydroxy-16α-methyl-21-acetoxypegna-1,4-diene-3,20-dione, and the 6β,7β-isomer;
1',2'-dicarboxycyclobutano-(3',4':6α,7α)-9α-fluoro-11β, 16α,17α-trihydroxy-21-acetoxypregna-1,4-diene-3,20-dione, and the 6β,7β-isomer;
1',2'-dimethyl-1',2'-dicarboxycyclobutano-(3',4':6α,7α)-11β,17α-dihydroxy-21-acetoxypregna-1,4-diene-3,20-dione, and the 6β,7β-isomer;
1',2'-dicarboxycyclobutano-(3',4':6α,7α)-11β,16α,17α-trihydroxy-21-acetoxypregna-1,4-diene-3,20-dione, and the 6β,7β-isomer;
1',2'-dicarboxycyclobutano-(3',4':6α,7α)-11β,17α-dihydroxy-16a-fluoro-21-acetoxypregna-1,4-diene-3,20-dione, and the 6β,7β-iosmer; and
1',2'-difluoro-1',2'-dicarboxycyclobutano-(3',4':6α,7α)-11β,17α-dihydroxy-16β-methyl-21-acetoxypregna-1,4-diene-3,20-dione, and the 6β,7β-isomer.

EXAMPLE 7

To 120 ml. of acetone containing 1 g. of 1'-cyclobuteno - (3',4':6α,7α) - 11β,16α,17α - trihydroxy - 21 - acetoxypregna-1,4-diene-3,20-dione are added 30 drops of 70% perchloric acid. The mixture is allowed to stand one hour at room temperature and then 30 drops of pyridine are added and the mixture is evaporated to dryness under reduced pressure. Thirty milliliters of water are added to the residue and this mixture is extracted several times with ethyl acetate. The combined ethyl acetate extracts are washed to neutrality with water, dried over sodium sulfate and evaporated to dryness. The resulting residue upon trituration with methanol yields 1'-cyclobuteno - (3',4':6α,7α) - 11β - hydroxy - 16α,17α - isopropylidenedioxy - 21 - acetoxypregna - 1,4 - diene - 3,20-dione which is recrystallized from benezene:ether.

By repeating the above procedure with the 6β,7β-isomer, there is obtained the corresponding 1'-cyclobuteno - (3',4':6β,7β) - 11β - hydroxy - 16α,17α - isopropylidenedioxy - 21 - acetoxypregna - 1,4 - diene - 3,20-dione.

Utilizing the same procedure, other novel 16α,17α-dihydroxy compounds, such as those described, e.g. in Examples 3 and 5 are converted to the corresponding 16α,17α-iospropylidenedioxy compounds, among which are the following specific compounds:

1'-cyclobuteno-(3',4':6α,7α)-9α-fluoro-11β-hydroxy-16α,17α-isopropylidenedioxy-21-acetoxypregn-4-ene-3,20-dione, and the 6β,7β-isomer;
1'-cyclobuteno-(3',4:6α,7α)-11β-hydroxy-16α,17α-isopropylidenedioxy-21-acetoxypregn-4-ene-3,20-dione, and the 6β,7β-isomer;
1'-cyclobuteno-(3',4':6α,7α)-9α-fluoro-11β-hydroxy-16α,17α-isopropylidenedioxy-21-acetoxypregna-1,4-diene-3,20-dione, and the 6β,7β-isomer; and
1'-cyclobuteno-(3',4':6α,7α)-11β-hydroxy-16α,17α-isopropylidenedioxy-21-acetoxypregna-1,4-diene-3,20-dione, and the 6β,7β-isomer.

EXAMPLE 8

Two milliliters of dihydropyran are added to a solution of 1 g. of 1'-cyclobuteno-(3',4':6α,7α)-11β,17α,21-trihydroxypregna-1,4-diene-3,20-dione in 15 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated to dryness to yield 1′-cyclobuteno-(3′,4′:6α,7α)-11β,17α - dihydroxy - 21 - (tetrahydropyran - 2′ - yloxy)-pregna-1,4-diene-3,20-dione which is recrystallized from benzene:dioxane.

By repeating the above procedure with the 6β,7β-isomer, there is obtained the corresponding 1′ - cyclobuteno - (3′,4′:6β,7β) - 11β,17α - dihydroxy - 21 - (tetrahydropyran-2′-yloxy)-pregna-1,4-diene-3,20-dione.

EXAMPLE 9

A mixture of 1 g. of 1′-cyclobuteno-(3′,4′:6α,7α)-11β-17α - dihydroxy - 21 - acetoxypregna - 1,4 - diene - 3,20-dione, 1 g. of p-toluenesulfonic acid monohydrate, 50 ml. of acetic acid and 25 ml. of acetic anhydride is allowed to stand at room temperature for ten hours, and then poured into water and stirred. This mixture is then extracted with methylene chloride and these extracts are dried and evaporated to yield 1′ - cyclobuteno - (3′,4′:6α,7α) - 11β - hydroxy - 17α,21 - diacetoxypregna - 1,4 - diene - 3,20 - dione which is recrystallized from acetone:ether.

By repeating the above procedure with the 6β,7β-isomer, there is obtained the corresponding 1′-cyclobuteno - (3′,4′:6β,7β) - 11β - hydroxy - 17α,21-diacetoxypregna-1,4-diene-3,20-dione.

By using the above procedure and starting materials but substituting propionic anhydride, caproic anhydride, enanthic anhydride and cyclopentylpropionic anhydride for acetic anhydride, there are obtained the corresponding 17α-propionates, 17α-caproates, 17α-enanthates, and 17α-cyclopentylpropionates, respectively.

EXAMPLE 10

A mixture of 2 g. of 1′-cyclobuteno-(3′,4′:6α,7α)-11β,17α,21-trihydroxypregna-1,4-diene-3,20-dione in 8 ml. of pyridine and 4 ml. of trimethylacetyl chloride is heated at steam bath temperatures for one hour. The mixture is then poured into ice water. The solid which forms is collected by filtration, washed with water, heated and dried to yield 1′-cyclobuteno-(3′,4′:6α,7α)-11β,17α-dihydroxy-21-trimethylacetoxypregna-1,4-diene-3,20-dione.

By repeating the above procedure with the 6β,7β-isomer, there is obtained the corresponding 1′-cyclobuteno - (3′,4′:6β,7β) - 11β,17α - dihydroxy - 21 - trimethylacetoxypregna-1,4-diene-3,20-dione.

Similarly, there is obtained from analogous 6α,7α and 6β,7β starting materials, the following final products, namely 1′ - cyclobuteno-(3′,4′:6α,7α)-11β-hydroxy-9α-fluoro-16α,17α - isopropylidenedioxy-21-trimethylacetoxypregna-1,4-diene-3,20-dione, and the 6β,7β-isomer;

1′ - cyclobuteno - (3′,4′:6α,7α)-11β,17α-dihydroxy-16α-methyl - 21 - trimethylacetoxypregna - 1,4-diene-3,20-dione, and the 6β,7β-isomer; and 1′ - cyclobuteno - (3′,4′:6α,7α)-11β-hydroxy-9α-fluoro-16α,17α - isopropylidenedioxy - 21 - trimethylacetoxypregn-4-ene-3,20-dione, and the 6β,7β-isomer.

EXAMPLE 11

A mixture of 1 g. of 1′,2′-dicarbonyloxycyclobutano-(3′,4′:6α,7α) - 11β,17α,21 - trihydroxypregn-4-ene-3,20-dione in 50 ml. of ethanol containing 0.5 ml. of p-toluenesulfonic acid is held at reflux for 24 hours. At the end of the reaction time, the pH of the solution is adjusted to neutral by the addition of base. The organic phase is evaporated to dryness to yield 1′,2′-dicarboxycyclobutano - (3′,4′:6α,7α)-11β,17α,21-trihydroxypregn-4-ene-3,20-dione which is further purified by recrystallization from acetone:ether.

By repeating the above procedure with the 6β,7β-isomer, there is obtained the corresponding 1′,2′-dicarbo- ethoxycyclobutano - (3′,4′:6β,7β)-11β,17α,21-trihydroxypregn-4-ene-3,20-dione.

Utilizing the above precodure,

1′,2′ - dicarbonyloxycyclobutano-(3′,4′:6α,7α)-9α-fluoro-11β,17α,21-trihydroxypregn-4-ene-3,20-dione, and the 6β,7β-isomer;

1′,2′ - dicarbonyloxycyclobutano - (3′,4′:6α,7α)-pregna-1,4-diene-3,20-dione, and the 6β,7β-isomer;

1′,2′ - dicarbonyloxycyclobutano-9α-fluoro-(3′,4′:6α,7α)-pregna-1,4-diene-3,20 dione, and the 6β,7β-isomer; are each separately converted to the corresponding 1′,2′-dicarboethoxy derivatives, namely, 1′,2′ - dicarboethoxycyclobutano-(3′,4′:6α,7α)-9α-fluoro-11β,17α,21-trihydroxypregn-4-ene-3,20-dione, and the 6β,7β-isomer;

1′,2′ - dicarboethoxycyclobutano - (3′,4′:6α,7α)-pregna-1,4-diene-3,20-dione, and the 6β,7β-isomer; and 1′,2′ - dicarboethoxycyclobutano-(3′,4′:6α,7α)-9α-fluoropregna-1,4-diene-3,20-dione, and the 6β,7β-isomer, respectively.

Utilizing the above procedure with the exception of substituting other alcohols for ethanol, such as methanol, n-amyl alcohol, isopropanol and then n-hexanol, there are obtained the corresponding 1′,2′-dicarbomethoxy-; 1′,2′-dicarboamyloxy-; 1′,2′-dicarboisopropoxy-; and 1′,2′-dicarbohexyloxy-; derivatives of the above starting materials.

EXAMPLE 12

To a solution of 5 g. of 11β,17α,21-trihydroxypregna-4,6-diene-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 11β-hydroxy - 17,20:20,21-bismethylenedioxypregna-4,6-dien-3-one which is recrystallized from methanol:ether.

A mixture of 2.0 g. of 11β-hydroxy-17,20:20,21-bis-methylenedioxypregna-4,6-dien-3-one and 0.8 g. of maleic anhydride in 140 ml. of benzene is irradiated with a 70 watt Hanau high pressure mercury vapor lamp with a Pyrex filter at room temperature for a period of one-half hour. At the end of the reaction time, which may be followed by the U.V. spectra, the reaction product is evaporated to dryness, under reduced pressure, to yield 1′,2′ - dicarbonyloxycyclobutano - (3′,4′:6α,7α)-11β-hydroxy - 17,20:20,21 - bismethylenedioxypregn-4-en-3-one which is recrystallized from methanol:methylene chloride.

A suspension of 1 g. of the above compound in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure to yield 1′2′ - dicarboxycyclobutano-(3′,4′:6α,7α)11β,17α,21-trihydroxypregn-4-ene-3,20-dione which is further purified by recrystallization from hexane:acetone.

A mixture of 1 g. of the above material, 4 ml. of pyridine and 2 ml. of acetic anhydride is allowed to stand at room temperature for 15 hours. The mixture is then poured into ice water and the solid which forms is collected by filtration, washed with water and dried to yield 1′2′ - dicarbonyloxycyclobutano-(3′,4′6α,7α)-11β,17α - dihydroxy-21-acetoxypregn-4-ene-3,20-dione which may be further purified through recrystallization from acetone:hexane.

EXAMPLE 13

Into the anode compartment of an electrolysis cell provided with smooth platinum electrodes, (each electrode measuring about 1 cm. x 3 cm. x 1.6 mm.) there is added 0.5 g. of 1′,2′-dicarboxycyclobutano-(3′,4′:6α,7α)-9α- fluoro - 11β,17α,21 - triacetoxy-16α-methylpregn-4-ene-3,20-dione in a mixture of 10 ml. of water, 40 ml. of pyridine and 1 ml. of triethylamine. A current density of 0.03 amps/cm.² is then applied for 24 hours while holding the reaction mixture in the anode compartment at reflux and under an atmosphere of nitrogen. Thereafter, the current is shut off and the reaction mixture is removed from the cell. The reaction mixture is concentrated under vacuum to a small volume which is then extracted with diethyl ether. The resulting diethyl ether phase is washed with 1 N hydrochloric acid, aqeous sodium bicarbonate and then water, dried and evaporated to dryness to yield 1'-cyclobuteno-(3',4':6α,7α)-9α-fluoro-11β,17α,21-triacetoxy-16α-methylpregn-4-ene-3,20-dione.

By repeating the above procedure with the 6β,7β-isomer, there is obtained the corresponding 1'-cyclobuteno - (3',4':6β,7β) - 9α-fluoro-11β,17α,21-triacetoxy-16α-methylpregn-4-ene-3,20-dione.

By repeating the above procedure with the exception of substituting first methanol and then dioxane for pyridine in the electrochemical medium, the above starting materials are each separately oxidized to the corresponding 1'-cyclobuteno-(3',4':6α,7α)-9α-fluoro - 11β,17α,21 - triacetoxy-16α-methylpregn-4-ene-3,20-dione and 1'-cyclobuteno-(3',4':6β,7β)-9α - fluoro - 11β,17α,21-triacetoxy-16α-methylpregn-4-ene-3,20-dione, respectively.

What is claimed is:

1. A compound selected from those of the formulas:

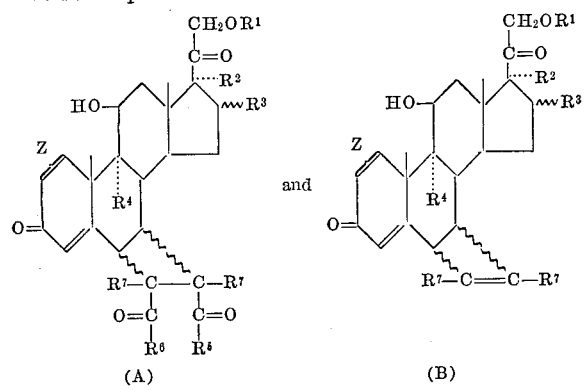

(A) and (B)

wherein
$R^1$ is hydrogen, tetrahydropyran-2'-yl or a hydrocarbon carboxylic acyl group containing less than 12 carbon atoms;
$R^2$ is hydrogen, hydroxy or a hydrocarbon carboxylic acyloxy group of less than 12 carbon atoms;
$R^3$ is hydrogen, α-methyl, β-methyl, α-fluoro, α-hydroxy, α-hydrocarbon carboxylic acyloxy group of less than 12 carbon atoms;
$R^2$ and $R^3$ together is the group

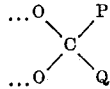

in which P is hydrogen, or lower alkyl and Q is hydrogen, or lower alkyl or aryl;
alkyl or aryl;
$R^4$ is hydrogen or fluoro;
$R^5$ and $R^6$ are each hydroxy or lower alkoxy or together is oxy;
$R^7$ is hydrogen, methyl or fluoro; and
Z is a carbon-carbon single bond or a carbon-carbon double bond.

2. A compound according to Formula A of claim 1 wherein $R^1$ is hydrogen, acetyl or trimethylacetyl; $R^2$ is hydrogen or hydroxy; $R^3$ is hydrogen, α-methyl, α-hydroxy or $R^2$ and $R^3$ together is the group

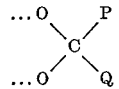

in which each of P and Q is methyl; and $R^5$ and $R^6$ together is oxy.

3. A compound according to Formula B of claim 1 wherein $R^1$ is hydrogen, acetyl or trimethylacetyl, $R^2$ is hydrogen or hydroxy; $R^3$ is hydrogen, α-methyl, α-hydroxy or $R^2$ and $R^3$ together is the group

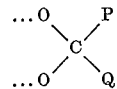

in which each of P and Q is methyl.

4. A compound according to claim 3 wherein $R^1$ is hydrogen; $R^2$ is hydroxy; $R^3$ is α-methyl; $R^4$ is hydrogen; each of $R^7$ is hydrogen; and Z is a carbon-carbon double bond.

5. A compound according to claim 3 wherein $R^1$ is hydrogen; $R^2$ is hydroxy; $R^3$ is α-methyl; $R^4$ is hydrogen; each of $R^7$ is hydrogen; and Z is a carbon-carbon single bond.

6. A compound according to claim 3 wherein $R^1$ is hydrogen; $R^2$ and $R^3$ together is the group

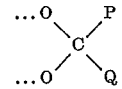

in which each of P and Q is methyl; $R^4$ is hydrogen; each of $R^7$ is hydrogen; and Z is a carbon-carbon double bond.

7. A compound according to claim 3 wherein $R^1$ is hydrogen; $R^2$ and $R^3$ together is the group

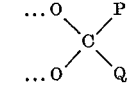

in which each of P and Q is methyl; $R^4$ is hydrogen; each of $R^7$ is hydrogen; and Z is a carbon-carbon single bond.

8. A compound according to claim 3 wherein $R^1$ is hydrogen; $R^2$ is hydroxy; $R^3$ is α-methyl; $R^4$ is fluoro; each of $R^7$ is hydrogen; and Z is a carbon-carbon double bond.

9. A compound according to claim 3 wherein $R^1$ is hydrogen; $R^2$ is hydroxy; $R^3$ is α-methyl; $R^4$ is fluoro; each of $R^7$ is hydrogen; and Z is a carbon–carbon single bond.

10. A compound according to claim 3 wherein $R^1$ is hydrogen; $R^2$ and $R^3$ together is the group

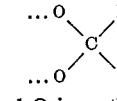

in which each of P and Q is methyl; $R^4$ is fluoro; each of $R^7$ is hydrogen; and Z is a carbon–carbon double bond.

11. A compound according to claim 3 wherein $R^1$ is hydrogen; $R^2$ and $R^3$ together is the group

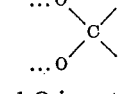

in which each of P and Q is methyl; $R^4$ is fluoro; each of $R^7$ is hydrogen; and Z is a carbon-carbon single bond.

12. A compound according to claim 3 wherein each of $R^1$, $R^2$, $R^4$, and $R^7$ is hydrogen; $R^3$ is α-methyl; and Z is a carbon-carbon double bond.

13. A compound according to claim 3 wherein each of $R^1$, $R^2$ and $R^7$ is hydrogen; $R^3$ is a α-methyl; $R^4$ is fluoro; and Z is a carbon-carbon double bond.

14. A compound according to claim 3 wherein each of $R^1$, $R^2$, $R^4$, and $R^7$ is hydrogen; $R^3$ is α-methyl; and Z is a carbon-carbon single bond.

15. A compound according to claim 3 wherein each of $R^1$, $R^2$ and $R^7$ is hydrogen; $R^3$ is α-methyl; $R^4$ is fluoro; and Z is a carbon-carbon single bond.

16. A process which comprises the steps of (1) adding photochemically, in an inert solvent and under ultraviolet irradiation, an anhydride selected from the group maleic anhydride, dimethylmaleic anhydride and difluoromaleic anhydride to a 3-keto-$\Delta$-$^{4,6}$-diene of the corticoid series, to obtain the corresponding 1′, 2′-dicarbonyloxycyclobutano-(3′, 4′:6, 7) derivative; (2) hydrolyzing under basic conditions said 1′,2′-dicarbonyloxycyclobutano-(3′,4′:6,7) derivative and then acidifying to obtain the corresponding 1′,2′-dicarboxycyclobutano-(3′,4′:6,7) derivative, and (3) oxidatively decarboxylating said 1′,2′-dicarboxycyclobutano-(3′,4′:6,7) derivative with an oxidizing agent selected from the group lead tetraacetate and thallium triacetate to obtain a 1′-cyclobuteno-(3′,4′:6,7) derivative of the corticoid series.

17. A process according to claim 16 wherein in step (3) said oxidative decarboxylation is carried out by treatment with lead tetraacetate.

18. A process according to claim 16 wherein said 1′-cyclobuteno-(3′,4′:6,7) derivative is catalytically hydrogenated with tris-triphenylphosphine rhodium chloride catalyst to the corresponding cyclobutano-(3′,4′:6,7) derivative.

No references cited.

HENRY A. FRENCH, Primary Examiner

U.S. Cl. X.R.

204—78, 158; 260—397.1, 397.45, 999